United States Patent
Shurvinton

(10) Patent No.: US 7,769,405 B2
(45) Date of Patent: Aug. 3, 2010

(54) CONTROL OF A MULTI-CARRIER POWER AMPLIFIER

(75) Inventor: William Shurvinton, Hook (GB)

(73) Assignee: Nokia Corporation, Espoo (FI)

( * ) Notice: Subject to any disclaimer, the term of this patent is extended or adjusted under 35 U.S.C. 154(b) by 554 days.

(21) Appl. No.: 10/168,567

(22) PCT Filed: Dec. 20, 2000

(86) PCT No.: PCT/EP00/13047

§ 371 (c)(1),
(2), (4) Date: Sep. 3, 2002

(87) PCT Pub. No.: WO01/48950

PCT Pub. Date: Jul. 5, 2001

(65) Prior Publication Data

US 2003/0069035 A1  Apr. 10, 2003

(30) Foreign Application Priority Data

Dec. 24, 1999  (GB)  ................... 9930715.9

(51) Int. Cl.
*H04B 7/00* (2006.01)
(52) U.S. Cl. ...................... 455/522; 370/321
(58) Field of Classification Search ............... 455/522, 455/116, 453; 375/297; 370/321, 332, 337, 370/347

See application file for complete search history.

(56) References Cited

U.S. PATENT DOCUMENTS

| 5,398,247 | A | * | 3/1995 | Delprat et al. | 370/347 |
| 5,930,242 | A | | 7/1999 | Mimura | |
| 6,400,954 | B1 | * | 6/2002 | Khan et al. | 455/450 |
| 6,473,608 | B1 | * | 10/2002 | Lehr et al. | 455/402 |
| 6,477,388 | B1 | * | 11/2002 | Schmutz | 455/522 |
| 6,542,482 | B1 | * | 4/2003 | Johansson et al. | 370/331 |
| 6,694,148 | B1 | * | 2/2004 | Frodigh et al. | 455/522 |
| 6,898,438 | B1 | * | 5/2005 | Uchida | 455/522 |
| 2003/0194979 | A1 | * | 10/2003 | Richards et al. | 455/216 |

FOREIGN PATENT DOCUMENTS

EP  0 887 947 A2  12/1998

\* cited by examiner

*Primary Examiner*—Nay A Maung
*Assistant Examiner*—Angelica M Perez
(74) *Attorney, Agent, or Firm*—Foley & Lardner LLP

(57) ABSTRACT

A method of operating a Time Division Multiple Access (TDMA) communication system is disclosed. The system includes a multi-carrier power amplifier. The method includes the steps of logging call activity on each timeslot of each carrier associated with the multi-carrier power amplifier; logging total transmit power of the multi-carrier power amplifier for each timeslot; and logging the data rate of any data calls being carried by the multi-carrier power amplifier. Transmission power is made available for a new call by reducing the transmission power of a data call.

25 Claims, 4 Drawing Sheets

CONTROL OF A MULTI-CARRIER POWER AMPLIFIER

This invention relates to a method and apparatus for dimensioning and controlling a multi-carrier power amplifier. It finds particular, but not exclusive use in a Base Transceiver Station (BTS) in a GSM based communication system adapted to use the EDGE data transmission standard.

Traditionally, GSM BTSs have employed single-carrier power amplification schemes. That is, a single amplifier chain was provided for each GSM carrier signal. Each GSM carrier signal comprises 8 time slots per frame, and is thus theoretically capable of supporting 8 conversations or data connections simultaneously.

Typically, a BTS comprises several transceiver units, each one having a dedicated power amplifier (PA). FIG. 1 shows a BTS configuration according to the prior art. In this example, eight transceiver units (TRX) are provided $10a$-$10h$. Each transceiver unit has an associated power amplifier (PA) $20a$-$20h$. The Power Amplifier is responsible for boosting the output power of the TRX to a suitable level for transmission. However, the resultant signals from each of the PAs have to be combined in order to route them to a common transmission antenna. This requires the use of a high power combiner 30, which has the drawback that a considerable amount of the input power is dissipated in the combining process. Typically, 3.2 dB is dissipated in heat per 2-way combine in a hybrid combiner. As the output of eight TRXs need combining, there are 3 combining stages needed, resulting in a loss of nearly 10 dB, or 90% of the amplified signal. This places constraints on the BTS in the fields of power regulation and thermal design.

The configuration is actually more complicated due to the provisions made for the receive path from the antenna, but we are only concerned with the transmission path here.

It is now possible to implement PAs which are capable of amplifying more than a single carrier signal. These are known as Multi-Carrier Power Amplifiers (MCPAs) or Multi-Carrier Linear Power Amplifiers (MCLPAs). Such a configuration is shown in FIG. 2. The TRXs $10a$-$10h$ are identical to those shown in FIG. 1, and each supports a single GSM carrier as before. The outputs from the TRXs are next combined in a low power combiner 50. The relative losses in this are still of the order of 10 dB in total, but as the input power to the combiner is considerably lower, the absolute power loss is much lower.

The output of the combiner 50 is next fed into the input of the MCPA 60. The MCPA is a wideband linear amplifier which, in this instance, is capable of amplifying the outputs of all eight TRXs simultaneously, before transmitting the signals via antenna 40.

One of the problems which has thus far held back deployment of MCPAs is the linearity which is required by the GSM specifications. GSM specification 05.05 Section 4.2.1, "Spectrum due to the modulation of wideband noise", particularly sets the limits on the acceptable levels of noise products due to non-linearity effects in the PA. Only recently has it been possible to implement MCPAs which meet all the necessary criteria laid out in the GSM specifications.

Defining the transmit power output requirement for a single carrier PA (SCPA) is straightforward. The SCPA is capable of supporting up to eight simultaneous connections—one on each of the timeslots which make up a GSM frame. Each timeslot is processed in turn, and so the maximum output power required form the SCPA is equivalent to the maximum power called for in any one of the timeslots. Defining the power output requirement for an MCPA can be more problematic. An assumption made in specifying the power output requirement for an MCPA is that if it is operating substantially linearly, then the total output power on a given timeslot is given by the sum of the individual powers of each carrier.

$$P_{TOT} = \sum_0^n P_n$$

where n=number of GSM carriers being amplified, which is eight in the example cited in FIG. 2.

A simple means of defining the maximum power required would be to assume that each individual carrier was operating at its maximum level, so that the total power output required is equal to the sum of each individual maximum power requirement, or $$P_{TOT} = n \cdot P_{MAX}$$

While this solution will produce an MCPA which will support each GSM carrier signal successfully under all conditions, it will be greatly over-specified, and will consume excessive amounts of energy. For example, linear PAs tend to be only 5-7% efficient, or to put it another way, 93-95% of the energy supplied is dissipated as heat. This inefficiency is due to the mode in which the amplifiers need to operate in order to meet the linearity specifications. The net result is that even if the transmitter is required to provide a relatively low amount of output RF power, or even no output at all, the amplifier remains biased in such a way that large amounts of heat have to be dissipated. For example, assuming that an MCPA supports eight 1 W carriers, then it must be designed to dissipate between 100 W and 150 W of heat energy.

Not only do such requirements impose difficult design constraints on BTSs in terms of heat dissipation, but component failures increase with such increases in temperature, posing reliability problems. The added charges for electricity also become significant when applied across an entire cellular network.

According to a first aspect of the present invention, there is provided a method of operating a Time Division Multiple Access (TDMA) communication system comprising a multi-carrier power amplifier (MCPA), comprising the steps of: logging call activity on each timeslot of each carrier associated with the multi-carrier power amplifier; logging total transmit power of the multi-carrier power amplifier for each timeslot; and logging the data rate of any data calls being carried by the multi-carrier power amplifier, wherein transmission power is made available for a new call by reducing the transmission power of a data call.

According to a second aspect of the present invention there is provided a communication system comprising: a multi-carrier power amplifier; and a database comprising: information concerning call activity on each timeslot of each carrier associated with the multi-carrier power amplifier; information concerning total transmission power of the multi-carrier power amplifier for each timeslot; and information concerning the data rate of any data calls supported by the multi-carrier power amplifier wherein the multi-carrier power amplifier is arranged to reduce the transmission power associated with a data call in order to make transmission power available for a new call.

Advantageously, the method and system may be applied to any communication system adapted to use the EDGE standard. EDGE is effectively an overlay which may be used with TDMA based communication systems such as GSM or IS-136. It uses substantially the same hardware and protocols, but uses a different modulation scheme to achieve higher data rates.

Advantageously, the realisation that the data rate on a particular call can be reduced, to free up transmission power for the new call, means that the new call can be accommodated at the expense of a potentially small, and possibly temporary, drop in the data rate of a single call.

Preferably, the assignment of timeslots to calls proceeds such that there is minimal variation in transmit power from one timeslot to the next. This ensures that should there be a demand for increased transmit power for any one call, then sufficient transmit power capacity should be available across all timeslots.

Preferably, if a call data rate has to be reduced to accommodate a new call, then the data call currently having the highest data rate will have its rate reduced, via reduced transmit power, before other calls. As the call parameters such as transmit power and data rate are continuously monitored, this test is continuously re-evaluated.

In an advantageous development, each call may have an assigned priority level. This may be due to the particular charging tariff to which a subscriber belongs, or it may be that a user can elect to pay a premium fee on a call by call basis to ensure that a high speed data connection is maintained for that call. Other scenarios exist where calls can be prioritised. Call priority level can be used to determine which of the currently supported calls can have its data rate reduced, with lower priority calls being affected first. The incoming call which is attempting call set up may also have a priority level which will influence how timeslots are allocated to it.

Calls may have associated with them a minimum data rate, below which they will not drop. In a preferred embodiment where EDGE is used to achieve higher data rates, then the minimum data rate corresponds to the data rate which could be achieved if the modulation scheme of the network underlying the EDGE standard were used. In the case of a GSM network, GMSK would be used to modulate the data. Using this modulation scheme, the data rate would be 9.6 Kbit/s.

In a case where the MCPA is not operating at maximum transmit power on each timeslot, but it has insufficient free power available on any one timeslot to be able to support a new call, then it is possible to reallocate the current timeslot assignments in such a way that what spare transmit power is available is reallocated to the same timeslot. This enables a carrier using that timeslot to support the new call.

For a better understanding of the present invention, and to understand how the same may be brought into effect, the invention will now be described, by way of example only, with reference to the appended drawings in which.

The current GSM network is going to be used increasingly for data rather than voice calls in the near future. Indeed, it is estimated that eventually, data calls by users browsing the World Wide Web, for instance, will eventually greatly outnumber voice calls over cellular networks.

This fact in conjunction with the increasing desire to use MCPAs creates new problems in call-management. Specifically, more timeslots are likely to be allocated to a single user, and the charging for use of the network may well develop along the line of charges per byte of data transferred, rather than connection time as is the norm at present.

The increasing use of GSM cellular networks for data traffic has an impact on power transmission requirements. This is particularly true in the EDGE system. EDGE is a standard which supplements TDMA systems, such as GSM, and allows relatively high speed data connections to be established using existing network infrastructure. The high speed is achieved via use of a different modulation scheme. GSM uses Gaussian Minimum Shift Keying (GMSK) and EDGE uses 8-PSK. To boost the data rate further, several timeslots can be used by the same user for data transfer. A drawback of EDGE is that its modulation scheme requires a higher Carrier to Interference Ratio (C/I) than GSM in order to operate reliably. GSM typically requires a C/I of 9 dB, whereas EDGE needs approximately 20 dB more than this.

Broadly speaking, there are two ways to increase C/I. The first way is to reduce the interference power (I). However, this is largely out of the control of the operator of the cellular system, as it is derived from other systems, and indeed other signals within his system. The second way is to increase the carrier power (C). However, this places demands on the transmission equipment, and goes on to cause interference to other systems, and so is not a viable option beyond a certain limit.

Figure 1:
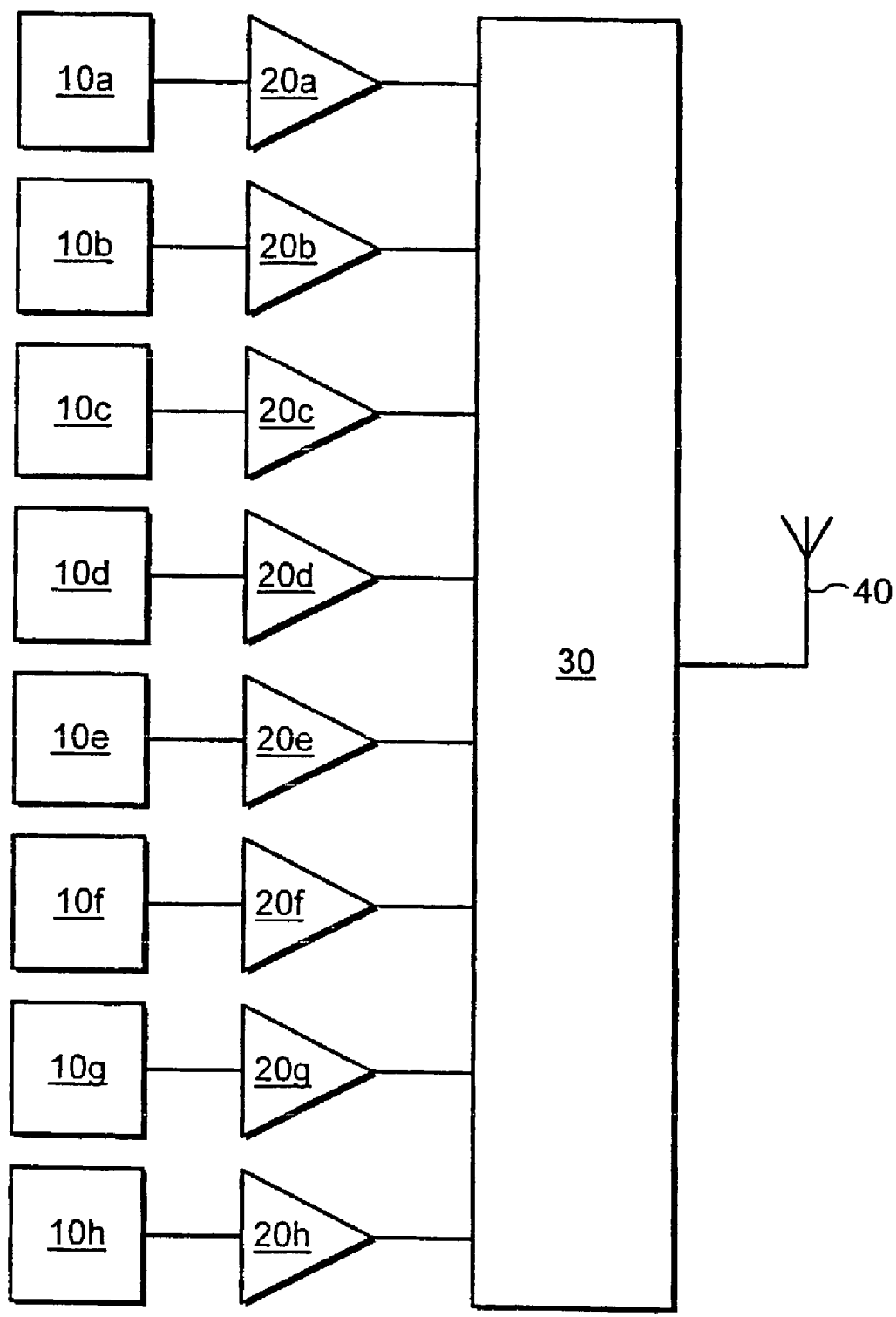
FIG. 1 shows some elements of the transmitter chain in a BTS utilising single carrier power amplifiers according to the prior art.
Figure 2:
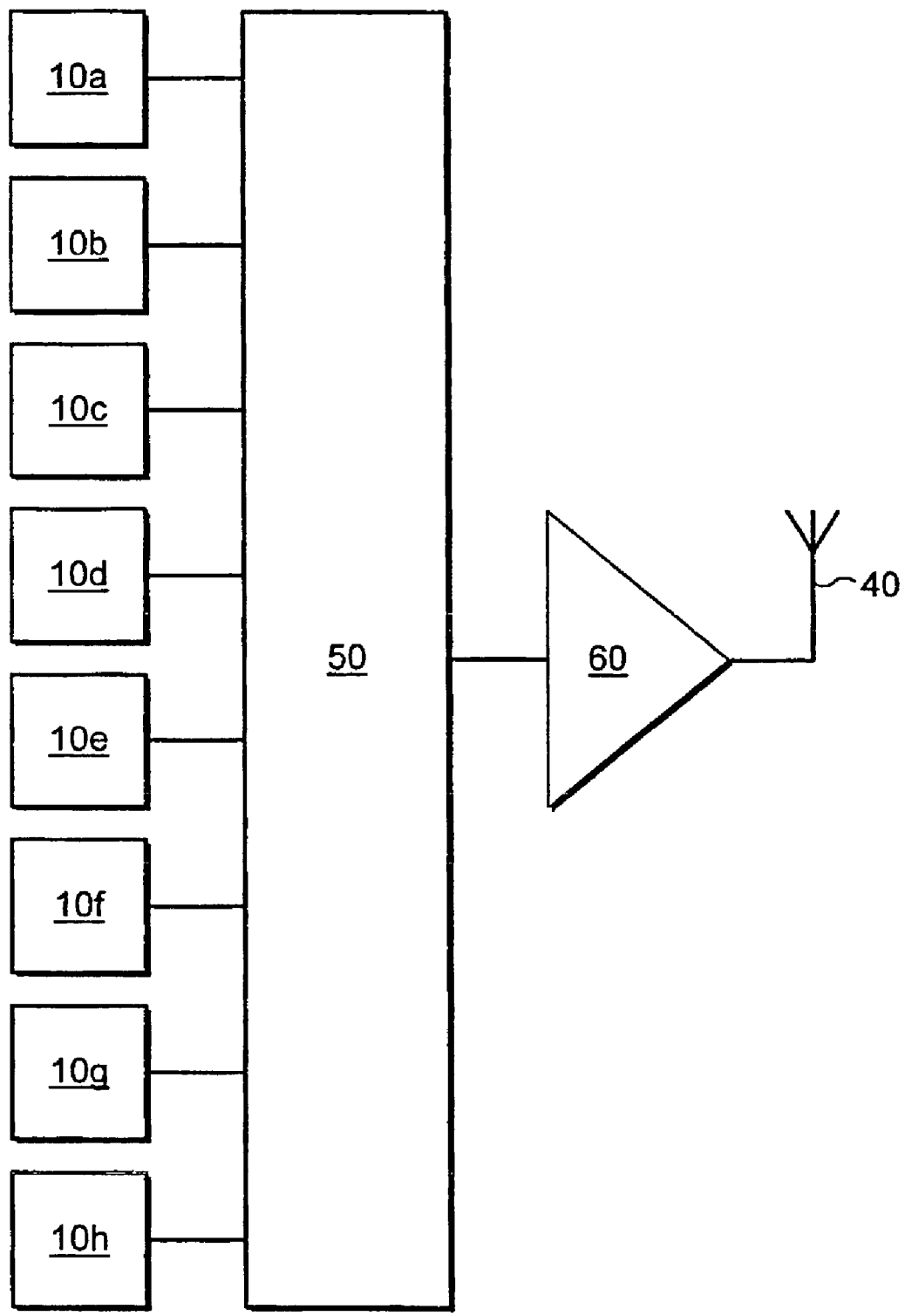
FIG. 2 shows some elements of the transmitter chain in a BTS utilising a multi-carrier power amplifier according to the prior art.
Figure 3:
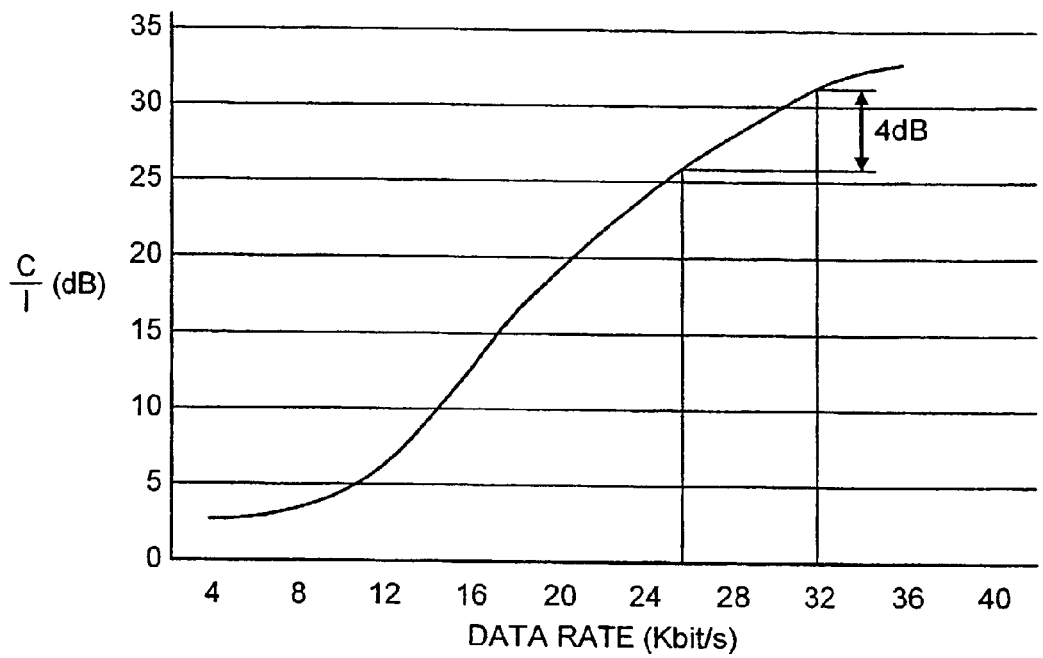
FIG. 3 shows a graph of achievable data rate in an EDGE system related to C/I.

In EDGE systems, it has been found empirically that there is a direct relationship between achievable data rates and C/I. FIG. 3 shows a graph representing empirical studies into the relationship. It can be seen that higher data rates are available for higher C/I values. This is to be expected, as a clearer signal mitigates the need for re-transmission of data which is lost due to poor connection quality. However, it can be seen that the relationship is not linear, and that increasing C/I linearly does not cause the data rate to increase similarly. The maximum achievable data rate tails off at higher values of C/I.

If the MCPA is running near its maximum output power, and a new voice or data call is initiated, or a handover is attempted into the cell it is serving, then a new timeslot on a carrier needs to be assigned. In the case where a BTS is equipped with SCPAs, the only factor that needs to be considered in determining whether a call can be accepted is whether a spare timeslot exists on any of the SCPAs. If a timeslot is available, the call is set up. In the case where an MCPA is used, there may well be one or more spare timeslots available, but now the factor which needs to be considered is whether there is sufficient transmit power available to support the new call.

If the MCPA is supporting a given number of data and voice calls, and the MCPA is operating at its maximum transmit power on all timeslots, one option is to refuse the new call set up. If the new call was an attempted handover, it might be transferred to another neighbouring cell. If that is not possible, it may stay connected to its current cell. If that is not possible, then the call will be dropped. None of these scenarios is particularly desirable.

A preferable embodiment of the invention continuously monitors the allocation of timeslots, the nature of the call on each timeslot, and the data rate being achieved for each data call. If an attempt is made to set up a new call when the MCPA is operating at maximum transmit power on all timeslots, or at such a level that insufficient transmit power is available to support the new call, then there are several options which can be pursued before call set up is refused.

|  | TS0 | TS1 | TS2 | TS3 | TS4 | TS5 | TS6 | TS7 |
| --- | --- | --- | --- | --- | --- | --- | --- | --- |
| TRX0 |  |  | −2 dB D:32 | −8 dB V | −4 dB V |  | −10 dB V | −4 dB V |
| TRX1 |  | −12 dB V | −12 dB V |  | −6 dB D:30 | 0 dB V |  | −4 dB V |
| TRX2 | −4 DB V | −6 dB |  | −2 dB | −6 dB |  | −12 dB |  |
| TRX3 | −8 DB V |  | −8 dB V |  |  |  | −6 dB D:24 | −8 DB V |
| TRX4 |  | −4 dB V |  | −2 dB D:26 |  | −6 dB V |  |  |
| TRX5 | −8 dB V |  |  | −8 dB V |  |  |  | −2 dB D:30 |
| TRX6 |  | −6 dB V |  |  | −8 dB V |  |  |  |
| TRX7 | −2 dB V |  | 0 dB V | −8 dB V |  |  | −4 dB V | −10 dB V |

An example of a database that is maintained by the system for each MCPA is given above. It shows which timeslots are active on which TRX, what the power level associated with the call is, and whether the call is data or voice. If it is a data call, the data speed is recorded also. 'V' signifies a voice call, and 'D' signifies a data call, with the number following being the data rate in Kbit/s. Blank cells in the table signify no call activity on that carrier/timeslot pair.

Firstly, if one or more of the calls being supported by the MCPA is a data call, then in order to free up some transmission power to support the attempted new call, the transmission power associated with one of the data calls can be reduced by an amount equal to the amount needed to support the new call.

The drop in transmission power for the present data call will result in a drop in the achievable data rate, as shown in FIG. 3.

Preferably, if there is more than one data call in progress, then the data call having the highest rate is reduced first.

Using the graph of FIG. 3, it can be seen that an EDGE call having a data rate of 32 Kbit/s can free up enough power for another call to operate at a transmission power of −4 dB if its transmission power is dropped by a corresponding amount. Consequently, the data rate experienced by that user drops to 26 Kbit/s. Such a drop in data rate will have an effect on the user of the MS making that call, but it will not be so dramatic as dropping the potential new call.

In the tabular example above, the data call on TRX0 at TS2 has a data rate of 32 Kbit/s and a transmit power level of −2 dB. As this call has the highest data rate, an embodiment of the invention would liberate some power on TS2 by reducing the transmit power associated with TRX0.

In any event, under the EDGE standard, the data rate will drop as the user experiences a weaker signal from the BTS. This means that at the edge of the cell, or in other areas of poor reception, the data rate achievable will be lower than if the MS were receiving a stronger signal. In the event that the signal reaching the MS is insufficient to maintain an EDGE connection, the modulation scheme switches to that of the underlying network, for instance, GSM. This offers a lower data rate, but one that is robust and generally guaranteed. In the GSM case, using GMSK modulation, the data rate available is 9.6 Kbit/s.

The level to which trade-offs between data rate and call connection occurs is determined by the system operator on the basis of which event is perceived to cause most inconvenience to users of the network. It is normally preferable to maintain a call, even if the data rate is reduced, so that a new call can be accommodated, than to refuse a call set up or to drop a call because it is not possible to hand it over to a new cell.

Figure 4:
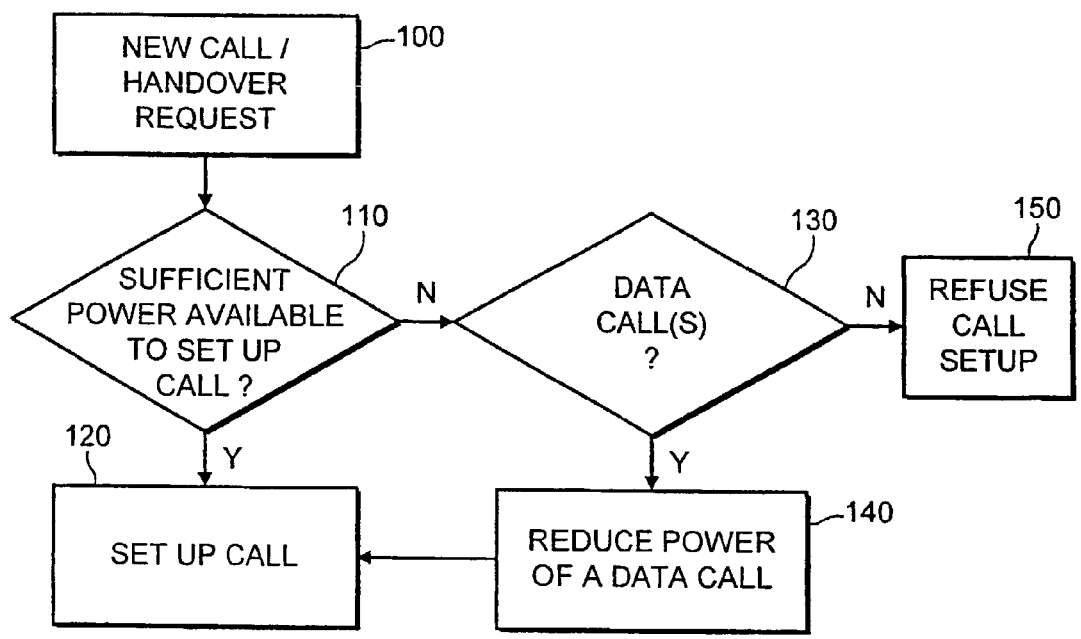
FIG. 4 shows a flowchart detailing operation of an embodiment of the invention.

FIG. 4 shows a flowchart which summarises operation of an embodiment of the invention.

At box 100, an attempt is made to set up a new call or hand over an existing call from a neighbouring cell. This can be a voice or a data call.

A check is made at 110 to determine whether sufficient transmit power is available in order to set up the call. This check is performed on the basis of the contents of the database which records call activity for a given MCPA.

If the call can be set up using the currently available free transmit power capacity, then call set up occurs as shown at 120.

If there is insufficient transmit power capacity to set up the call, the next check 130 determines whether a data call is listed amongst the currently supported calls.

If there is one or more data calls in progress then one of them will have their transmission power reduced 140. In a preferred embodiment, the data call currently enjoying the highest data rate is selected to have its transmission power reduced ahead of any other data calls. In any event, the transmission power of any given data call will not be reduced below a guaranteed minimum.

Once this has been done, and sufficient transmission power has been freed up for the new call, the new call is set up 120.

If there are no data calls in progress, then it is necessary to refuse call set up of the new call 150.

Secondly, if, for example, two time slots have some spare transmit power capacity, but not enough to support the new call individually, then the timeslot allocations of the currently supported calls can be re-arranged so that the two portions of spare capacity can be re-allocated on the same timeslot so that the new call can be set up on that timeslot.

This will incur some delay in the call set up process while the existing timeslot allocations are re-ordered, but this delay will not be noticeable to a user.

Thirdly, it may be possible in the future to attach priorities to certain call types. This may be based on any number of different factors such as the charging tariff to which a customer belongs, whether a call is data, voice or fax, or whether a user has selected to pay a call-by-call premium to enjoy a high data rate. It is possible to assign certain users the lowest possible priority so that they can effectively only make emergency calls. If the calls being supported by the MCPA contain a number of calls of differing priority levels, then the decision on which call has its data rate reduced may be made based on the relative priority levels of all currently supported calls.

Figure 5:
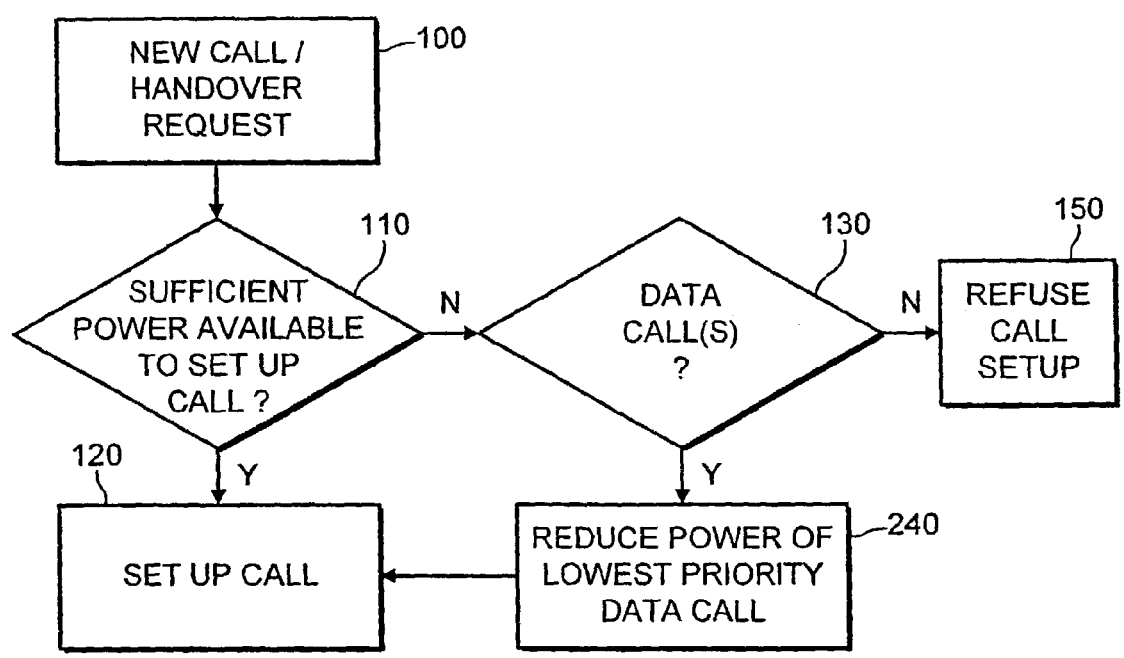
FIG. 5 shows a flowchart detailing operation of another embodiment of the invention.

This is summarised in FIG. 5, which shows a flowchart similar to that of FIG. 4. All steps are identical except that step 140 is replaced by step 240 whereby the data call having the lowest assigned priority has its transmission power reduced before any other data call.

One or more of the embodiments herein described can be combined with one or more of the other embodiments herein described.

These measures ensure that the maximum number of calls is maintained by the communication network. The result may be reduced data rate for some users in some circumstances, but it will allow more users access to the network, which is generally preferable to calls being dropped at handover, or not set up in the first instance.

In the light of the foregoing description, it will be clear to the skilled man that various modifications may be made within the scope of the invention. In particular, the EDGE standard may be replaced with another variable data rate transmission standard. The underlying network has been described in terms of GSM, but the skilled man will realise that any suitable TDMA system could be used instead.

The present invention includes any novel feature or combination of features disclosed herein either explicitly or any generalisation thereof irrespective of whether or not it relates to the claimed invention or mitigates any or all of the problems addressed.

The invention claimed is:

1. A method of operating a Time Division Multiple Access (TDMA) communication system comprising a multi-carrier power amplifier, comprising the steps of:
   logging call activity on each timeslot of each carrier associated with the multi-carrier power amplifier;
   logging total transmit power of the multi-carrier power amplifier for each timeslot; and
   logging the data rate of any data calls being carried by the multi-carrier power amplifier, and wherein
   transmission power is made available for a new call by reducing the transmission power of a data call and a data call currently having a highest data rate has transmit power thereof reduced before another data call having a lower data rate.

2. A method as claimed in claim 1 wherein:
   the communication system operates according to the EDGE standard.

3. A method as claimed in claim 1, wherein:
   timeslots are assigned such that the total transmission power is substantially constant across all timeslots.

4. A method as claimed in claim 2, wherein:
   timeslots are assigned such that the total transmission power is substantially constant across all timeslots.

5. A method as claimed in claim 1 wherein:
   each call has an associated priority level, and a call having a lower priority level has a transmit power level thereof reduced before a call with a higher priority level.

6. A method as claimed in claim 2 wherein:
   each call has an associated priority level, and a call having a lower priority level has a transmit power level thereof reduced before a call with a higher priority level.

7. A method as claimed in claim 3 wherein:
   each call has an associated priority level, and a call having a lower priority level has a transmit power level thereof reduced before a call with a higher priority level.

8. A method as claimed in claim 4 wherein:
   each call has an associated priority level, and a call having a lower priority level has a transmit power level thereof reduced before a call with a higher priority level.

9. A method as claimed in claim 1 wherein:
   if the multi-carrier power amplifier is not operating at maximum transmit power, but insufficient transmit power is available in any one timeslot, then timeslots are reallocated such that any available transmit power is re-allocated to a single timeslot.

10. A method as claimed in claim 2 wherein:
    if the multi-carrier power amplifier is not operating at maximum transmit power, but insufficient transmit power is available in any one timeslot, then timeslots are reallocated such that any available transmit power is re-allocated to a single timeslot.

11. A method as claimed in claim 3 wherein:
    if the multi-carrier power amplifier is not operating at maximum transmit power, but insufficient transmit power is available in any one timeslot, then timeslots are reallocated such that any available transmit power is re-allocated to a single timeslot.

12. A method as claimed in claim 5 wherein:
    if the multi-carrier power amplifier is not operating at maximum transmit power, but insufficient transmit power is available in any one timeslot, then timeslots are reallocated such that any available transmit power is re-allocated to a single timeslot.

13. A method as claimed in claim 1, wherein:
    the transmit power associated with a data call has a defined minimum value.

14. A method as claimed in claim 2, wherein:
    the transmit power associated with a data call has a defined minimum value.

15. A method as claimed in claim 3, wherein:
    the transmit power associated with a data call has a defined minimum value.

16. A method as claimed in claim 5, wherein:
    the transmit power associated with a data call has a defined minimum value.

17. A method as claimed in claim 9, wherein:
    the transmit power associated with a data call has a defined minimum value.

18. A method as claimed in claim 13, wherein:
    the defined minimum value is equivalent to the data rate achievable using a GMSK modulation scheme.

19. A method as claimed in claim 1, wherein:
    a new call will not be set up if insufficient transmit power is available to support the new call.

20. A method as claimed in claim 2, wherein:
    a new call will not be set up if insufficient transmit power is available to support the new call.

21. A method as claimed in claim 3, wherein:
    a new call will not be set up if insufficient transmit power is available to support the new call.

22. A method as claimed in claim 5, wherein:
    a new call will not be set up if insufficient transmit power is available to support the new call.

23. A method as claimed in claim 9, wherein:
    a new call will not be set up if insufficient transmit power is available to support the new call.

24. A method as claimed in claim 13, wherein:
    a new call will not be set up if insufficient transmit power is available to support the new call.

25. A communication system comprising:
    a multi-carrier power amplifier; and a database comprising information concerning call activity on each timeslot of each carrier associated with the multi-carrier power amplifier; information concerning total transmission power of the multi-carrier power amplifier for each timeslot; and information concerning a data rate of any data calls supported by the multi-carrier power amplifier; and wherein the multi-carrier power amplifier reduces the transmission power associated with a data call in order to make transmission power available for a new call and a data call currently having a highest data rate has transmit power thereof reduced before another data call having a lower data rate.

* * * * *